US005351937A

United States Patent [19]

Nishi et al.

[11] Patent Number: 5,351,937

[45] Date of Patent: Oct. 4, 1994

[54] HOIST AND TRACTION MACHINE WITH FREE ROTATION CONTROL

[75] Inventors: Yoshio Nishi; Yasuo Wada; Haruo Kubota; Munenobu Honda; Yoshio Ueno, all of Osaka Sayama, Japan

[73] Assignee: Elephant Chain Block Company Limited, Osaka, Japan

[21] Appl. No.: 945,403

[22] Filed: Sep. 16, 1992

[30] Foreign Application Priority Data

| | | | |
|---|---|---|---|
| Sep. 20, 1991 | [JP] | Japan | 3-241372 |
| Dec. 2, 1991 | [JP] | Japan | 3-318040 |
| Sep. 11, 1992 | [JP] | Japan | 4-243808 |
| Sep. 11, 1992 | [JP] | Japan | 4-243809 |

[51] Int. Cl.[5] .......... B66D 1/14; F16D 7/02

[52] U.S. Cl. .......... 254/352; 254/353; 254/365; 464/46

[58] Field of Search .......... 254/352, 346, 365, 369, 254/376, 372, 353; 192/8 R, 7 R; 464/45, 46, 47

[56] References Cited

U.S. PATENT DOCUMENTS

| | | | |
|---|---|---|---|
| 3,092,983 | 6/1963 | Huber | 464/46 |
| 4,469,308 | 9/1984 | Nakamura et al. | 254/352 X |
| 4,471,946 | 9/1984 | Maeda . | |
| 4,483,519 | 11/1984 | Nakamura . | |
| 4,496,136 | 1/1985 | Maeda | 464/46 X |
| 4,512,555 | 4/1985 | Nakamura | 254/376 X |
| 4,706,801 | 11/1987 | Vessey | 464/46 X |
| 4,768,754 | 9/1988 | Nishimura | 254/352 X |
| 4,888,539 | 12/1989 | Estabrook et al. | 464/45 X |
| 5,088,694 | 2/1992 | Nishimura | 254/352 |
| 5,156,377 | 10/1992 | Nishimura | 254/352 X |
| 5,238,226 | 8/1993 | Nishimura | 254/352 |

FOREIGN PATENT DOCUMENTS

| | | |
|---|---|---|
| 3309675 | 12/1983 | Fed. Rep. of Germany . |
| 3323150 | 1/1984 | Fed. Rep. of Germany . |
| 54-9381 | 4/1979 | Japan . |

*Primary Examiner*—Daniel P. Stodola
*Assistant Examiner*—Michael R. Mansen
*Attorney, Agent, or Firm*—Stevens, Davis, Miller & Mosher

[57] ABSTRACT

A hoist and traction machine having a free rotation control device/apparatus for selectively controlling the mechanical brake to be inoperative and for maintaining the inoperative mode of the mechanical brake, so as to control the free rotation of the load sheave. The free rotation control device is designed such that improved free rotation control operation can be provided, and the range of the pulling force for the chain can be enlarged in the controlled free rotation of the load sheave; thus, allowing the chain to be pulled quicker, while requiring little operating skill. Further, free rotation operation is not provided when the load sheave (and thus the driving shaft) is subjected to a large load acting in the direction of hoisting down the load, thus achieving highly improved safety.

2 Claims, 8 Drawing Sheets

HOIST AND TRACTION MACHINE WITH FREE ROTATION CONTROL

FIELD OF THE INVENTION

The present invention relates to a hoist and traction machine, and more particularly to a hoist and traction machine provided with: a load sheave; a driving shaft, provided with a driven member, for driving the load sheave; a driving member screwable with the driving shaft; a braking pawl and a braking ratchet wheel and braking plates, which are interposed between the driving member and the driven member and constitute a mechanical brake; and driving means, such as a manual lever or the like, for driving the driving member normally or reversely.

BACKGROUND OF THE INVENTION

Conventionally, this kind of hoist traction machine is well-known and is disclosed in, for example, the Japanese Patent Publication Gazette No. Sho 54-9381. The hoist and traction machine disclosed therein is so constructed that, as shown in FIG. 14, onto a driving shaft B in association with a load sheave A through a gear reduction mechanism is mounted a driven member C non-rotatable relative to the driving shaft B, a driving member D provided at the outer periphery with teeth N is screwed with the driving shaft B, between the driven member C and the driving member D are interposed a braking ratchet wheel F engageable with a braking pawl E and braking plates 6 so as to construct a mechanical brake, and a lever H for driving the driving member D in the normal or reverse direction is provided at the driving member D. The lever H is operated to normally or reversely rotate the driving member D through a change-over pawl I selectively engageable with one of the teeth N, so that the mechanical brake comprising the braking ratchet wheel F, braking plates G, driving member D and driven member C, is operated, thereby enabling a chain J engaging with the load sheave A to hoist, lower or haul a load.

The hoist and traction machine constructed as mentioned above is provided with a free rotation control apparatus to be discussed below, which can quickly pull out the chain J toward the load side thereof in the no load state without operating the mechanical brake so as to elongate the chain at the load side, or can pull the same at the no-load side so as to be quickly reduced in length at the load side.

In detail, the free rotation control apparatus is provided between the driven member C and the driving member D with an elastic resistance member K for applying resistance against the movement of the driving member D toward the driven member C and adapted to produce a small gap Q between a holding member L fixed to the driving member D and a stopper M fixed to one axial end of the driving shaft B, during the rotational braking of the load sheave A. The change-over pawl I is set in the neutral position and the chain in the no-load state is pulled at the load side so that the driving shaft B rotates, but the driving member D is suppressed of from moving toward the driven member C due to resistance of the elastic resistance member K. Hence, the mechanical brake does not operate and the load sheave A is freely rotatable, thereby enabling the load sheave A to be put in the free rotation state and the chain J to be quickly drawn out.

Such a conventional free rotation control apparatus, which applies resistance only by the elastic resistance member K against the movement of driving member D toward the driven member C, so that, when the chain J in the no-load state is drawn in the state of disengaging the pawl I from the teeth N, if the drawing speed is too fast and the drawing force too strong, the driving member D moves toward the driven member C overcoming resistance of the elastic resistance member K and the mechanical brake operates, thereby not enabling the load sheave A to freely rotate, so that an input range of a drawing force is restricted. Accordingly, while the drawing speed, that is, a force to draw the chain J, is being adjusted, the chain J in the no-load state should be drawn without operating the mechanical brake, thereby creating the problem in that it requires skill to freely rotate the load sheave A.

SUMMARY OF THE INVENTION

In light of the above problem, the present invention has been designed. An object thereof is to provide a hoist and traction machine which can enlarge an input range of a pulling force of the chain during the free rotation control, hold a load sheave in the free rotation state without requiring skill, perform quick pulling work of the chain, require merely operating an operating handle to perform free rotation, perform with ease the free rotation control, and incapacitate the free rotation control when subjected to a load, thereby providing great safety.

The present invention is characterized in that the hoist and traction machine provided with the conventional mechanical brake is provided with a free rotation control apparatus constructed to incapacitate the mechanical brake and to enable the load sheave to freely rotate.

In detail, the free rotation control apparatus is provided with:

a) a stopper provided at one axial end of the driving shaft;

b) an operating handle for free rotation, which is interposed between the stopper and the driving member so as to be axially movable across from a first position in proximity to the driving member and a second position apart from the driving member, and being non-rotatable with respect to the driving shaft;

c) an elastic biasing member, interposed between the stopper and the operating handle, for biasing the operating handle toward the first position in proximity to the driving member;

d) regulation means, provided between the operating handle and the driving member, for regulating a relative rotation range of the driving member with respect to the driving shaft when the operating handle is put in the first position and for enabling the regulation to be released when the same is put in the second position; and e) free rotation control holding means for putting the operating handle in the second position so as to release the regulation with the regulation means, so that, when the operating handle rotates for free rotation, the driving member is subjected to a biasing force by the elastic biasing member so as to hold the free rotation by the operating handle. The free rotation control holding means comprises a free rotation control surface and an engaging projection in elastic contact with the free rotation control surface by a biasing force of the elastic biasing member, so that one of the free rotation control surface and engaging projection is provided at one of the opposite surfaces of the driving member and operating handle, and the other of the free rotation control surface and engaging projection is provided at the other of the opposite surfaces of the same. The regulation means is provided with a first regulation surface and a second regulation surface engageable with the engaging projection, the free rotation control surface being provided at the second regulating surface in continuation thereof. Also, on at least one of the second rotation surface and the opposite surface of the engaging projection with respect to the second regulation surface, a slanted guide surface is provided for guiding the engaging projection to the free rotation control surface when the operating handle rotates in the direction of free rotating operation.

The above-mentioned construction obtains the following operational effect: In detail, the operating handle, when operated to free rotation, merely rotates to be moved against the elastic biasing member toward the second position where the operating handle moves away from the driving member so as to enable the regulation by the regulation means to be released and the handle rotates to forcibly rotate the driving member so as to enable the driving member to move away from the braking plate, whereby it is possible to release the braking action of the mechanical brake, which comprises a braking ratchet wheel and braking plates. Then, the free rotation control holding means applies the biasing force of the elastic biasing member onto the driving member so as to hold the state where the braking action by the brake is released, that is, the state of free rotation. Accordingly, an input range of the pulling force of chain during the free rotation control is enlarged by the holding, thereby enabling the chain at the load side to be quickly elongated and shortened without requiring skill. Moreover, the operating handle is merely rotatably operated, in other words, the operating handle need not be axially pulled to be put in the second position, whereby the operating handle can be improved in the operational efficiency to that extent during the free rotation control.

When the chain engaged with the load sheave is subjected to the load, the operating handle, even when operated for free rotation, reversely rotates by the load with respect to the driving member so as not to freely rotate the load sheave, thereby improving safety.

The free rotation control apparatus of the present invention is also characterized in that it is applied to an overload prevention mechanism as follows:

Namely, the driving member comprises a first driving member having a boss screwable with the driving shaft and a larger diameter portion opposite to the brake plate at the mechanical brake and a second driving member supported rotatably relative to the boss of the first driving member. Friction plates and an elastic biasing member are supported on the boss of the first driving member. An adjusting member is screwably attached to the boss of the first driving member for changing a biasing force applied by the elastic biasing member to the friction plates so as to adjust a slip load, the adjusting member being disposed opposite to the operating handle, and between the adjusting member and the operating handle are provided a regulation portion for regulating the relative rotation range of the driving member with respect to the driving shaft in the first position of the operating handle and free rotation holding means which, when the operating handle is put in the second position to release regulation, applies the biasing force of the elastic biasing member so as to hold the free rotation operation by the operating handle and which comprises the free rotation control surface and an engaging portion in elastic contact therewith, against which the driving handle elastically abuts so as to hold the free rotation operation of the driving shaft by the handle.

In this construction, merely the free rotation operation of the operating handle can freely rotatably control the load sheave as mentioned above and can hold the free rotation operation, so that, when the operating handle is operated not to freely rotate the load sheave, the first driving member is screwed forwardly and backwardly with respect to the driven member to actuate the mechanical brake, and the overload prevention mechanism adjustable of the rating load by the adjusting member can be operated.

Accordingly, the overload prevention mechanism is operated to prevent overloading. Also the driving shaft can be kept in the free rotation state only by simple rotatable operation of the free rotation operating handle without requiring skill. Moreover, the adjusting member for adjusting the slip load onto the overload prevention mechanism can be used both as parts for adjusting the rating load of overload prevention mechanism and holding the driving shaft in the free rotation state, thereby enabling the number of parts to be reduced.

These and other objects of the invention will become more apparent in the detailed description and examples which follow.

DETAILED DESCRIPTION OF THE INVENTION

At first, the first embodiment of the hoist and traction machine shown in FIGS. 1 through 7 will be described.

Figure 1:
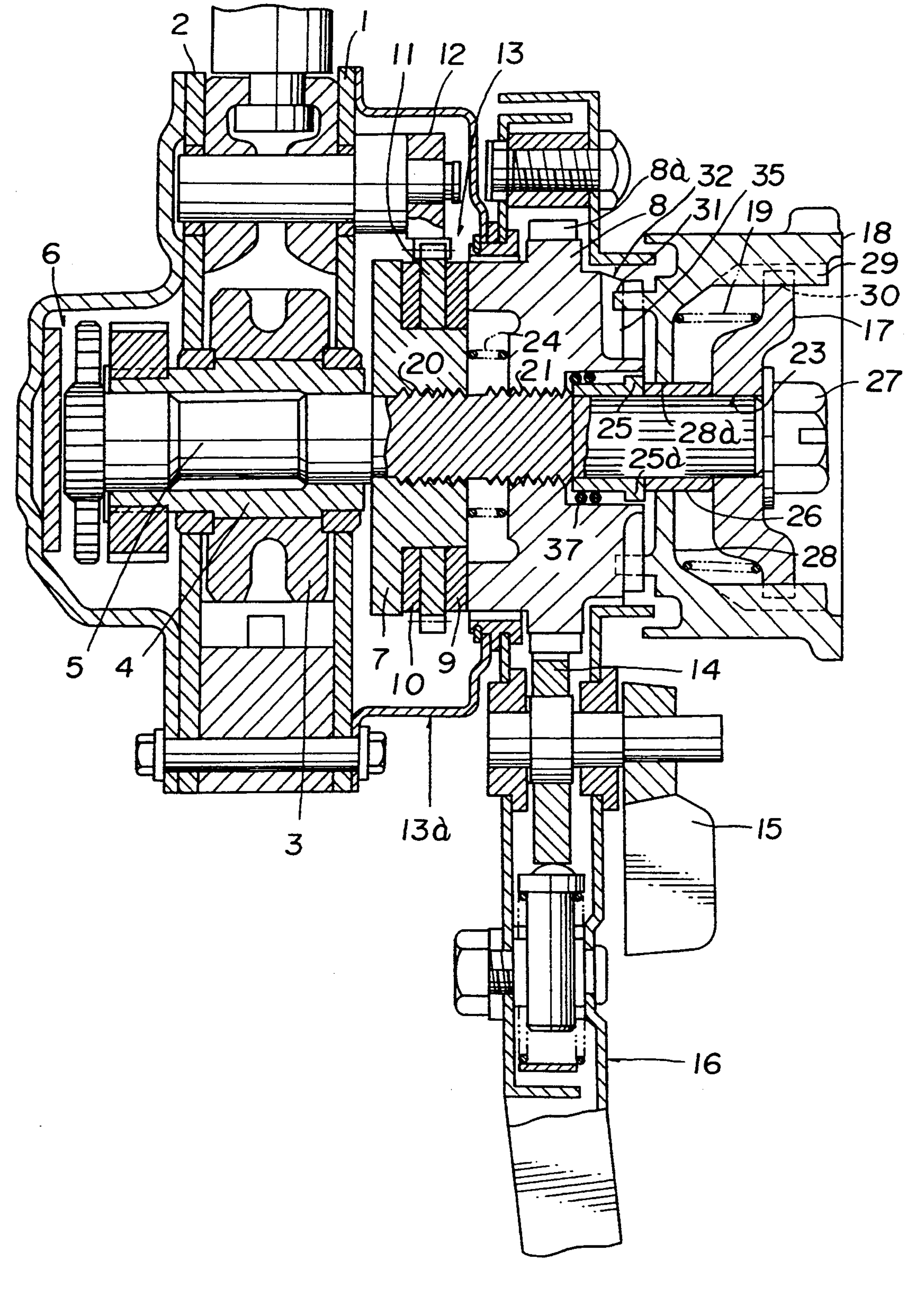
FIG. 1 is a longitudinally sectional view of a first embodiment of a lever type hoist and traction machine of the invention.

The first embodiment of the lever type hoist and traction machine, as shown in FIG. 1, is so constructed that a tubular shaft 4 having a load sheave 3 is rotatably supported between a first side plate 1 and a second side plate 2 disposed opposite to each other and spaced at a predetermined interval, a driving shaft 5 is relatively-rotatably supported within the tubular shaft 4, a driving torque is transmitted to driving shaft 5 from an operating lever to be discussed below, and a reduction gear mechanism 6 comprising a plurality of reducing gears is interposed between an outside end of a driving shaft 5 projecting from the second side plate 2 and the load sheave 3, so that the reduction gear mechanism 6 reduces the driving torque and transmits it toward the load sheave 3.

A driven member 7, comprising a hub having a flange, screws with an outer portion of the driving shaft 5 projecting from the first side plate 1, a driving member 8 having at the outer periphery thereof teeth 8*a* screws with the driving shaft 5 at the outside of the driven member 7, a pair of braking plates 9 and 10 and a braking ratchet wheel 11 are interposed between the driving member 8 and the driven member 7, and a braking pawl 12 engageable with the braking ratchet wheel 11 is provided at the first side plate 1, so that the braking ratchet wheel 11 and braking plates 9 and 10 constitute a mechanical brake 13.

Furthermore, outside a brake cover 13*a* for covering the outer periphery of the mechanical brake 13 and radially outwardly of the driving member 8 is provided driving means comprising an operating lever 16 which has a pawl member 14 provided with normal and reverse rotation pawls engageable with the teeth 8*a* provided at the outer periphery of the driving member 8 and has a control portion 15 for controlling the pawl member 14 to engage with or disengage from the teeth 8*a*.

In the lever type hoist and traction machine constructed as mentioned above, a stopper 17 is provided at an axial end of the driving shaft 5, an operating handle 18 non-rotatable with respect to the driving shaft 5 is interposed between the stopper 7 and the driving member 8 so as to be axially movable across from a first position where the handle 18 moves toward the driving member 8 to a second position where the same moves away therefrom. Between the operating handle 18 and the stopper 17 is provided an elastic biasing member 19, mainly comprising a coil spring, for biasing the handle 18 toward the driving member 8. Between the operating handle 18 and the driving member 8 is provided regulation means which can regulate a relative rotation range of the driving member 8 with respect to the driving shaft 5 and release the regulation of the range by moving the handle 18 away from the driving member 8.

In other words, in the first embodiment shown in FIG. 1, first and second threaded portions 20 and 21 and a serration portion 23 are provided on the driving shaft 5, the driven member 7 screws with the first threaded portion 20 and the driving member 8 screws with the second threaded portion 21, a coil spring 24 is interposed between the driven member 7 and the driving member 8 and restricts the axial movement of driven member 7 with respect to the driving shaft 5, and the driving member 8 is normally rotated with respect to the driving shaft 5 so as to screw forward in the leftward direction in FIG. 1. Also, a pair of sleeves 25 and 26 are fitted onto the serration portion 23 on the driving shaft 5 axially outside of the driving member 8, a flange 25*a* is provided at the first sleeve 25, a stopper 17 is mounted by serration coupling to the end of the serration portion 23 outside the second sleeve 26, and a nut 27 is tightened to fix the stopper 17 to the driving shaft 5 through the sleeves 25 and 26.

Figure 2:
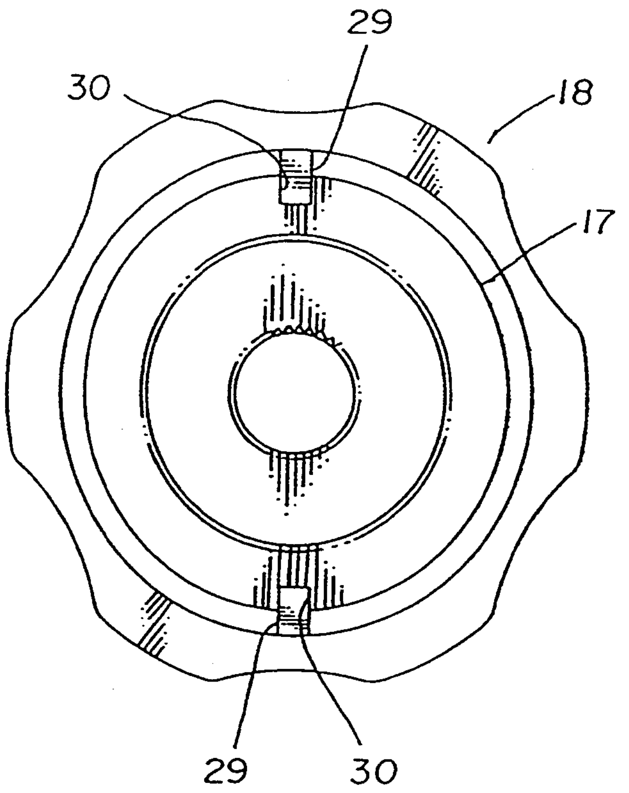
FIG. 2 is an illustration of the engaging state of ridges 29 at an operating handle with engaging grooves 30 at a stopper 17.

The second sleeve 26 is fitted through a bore 28*a* provided at a boss 28 of the operating handle 18, so that the operating handle 18 is interposed between the stopper 17 and the driving member 8. As shown in FIG. 2, a pair of ridges 29 are provided at the inner periphery of operating handle 18 so as to engage with engaging grooves 30 provided at the outer periphery of stopper 17 as shown in FIGS. 1 and 2, thereby making the operating handle 18 non-rotatable with respect to the driving shaft 5.

Between the axially outside surface of the boss 28 of operating handle 18 and the axially inside surface of the stopper 17 opposite to the boss 28, the elastic biasing member 19 is interposed in contact with the respective side surfaces so as to bias the operating handle 18 toward the flange 25*a* of the first sleeve 25 in the direction of moving away from the stopper 17, i.e. toward the driving member 8.

Figure 3:
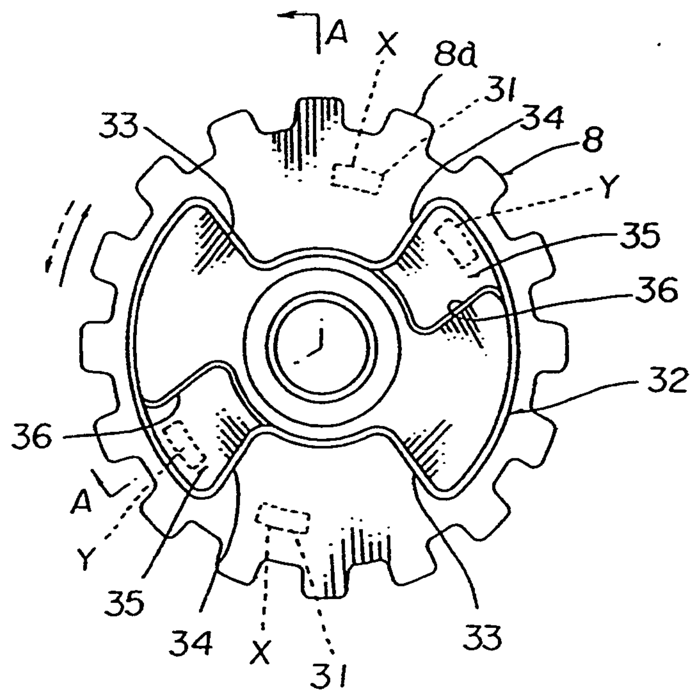
FIG. 3 is a front view of a driving member, in which a relative rotation range of the driving member with respect to a driving shaft and a rotary position of each engaging projection with respect to the driving member during the free rotation are shown.
Figure 4:
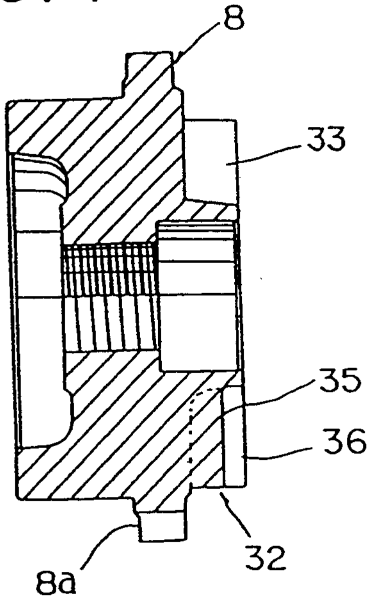
FIG. 4 is a sectional view taken on the line A—A in FIG. 3.
Figure 6:
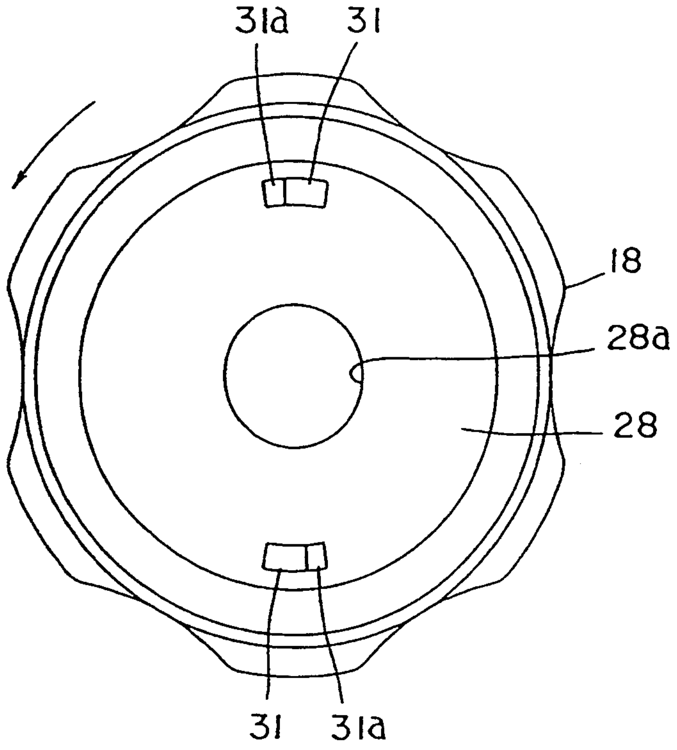
FIG. 6 is an interior view of an operating handle when viewed from the surface thereof opposite to the driving member.

Furthermore, two engaging projections 31 projecting toward the driving member 8, are, as shown in the dotted lines in FIG. 3, symmetrically provided at the radial end portion at the rear surface of the boss 28 of operating handle 18. A pair of projecting portions 32, as shown in FIGS. 3 and 4, are symmetrically provided at one axial side of the driving member 8 opposite to the boss 28 at the operating handle 18. At the projecting side surfaces of the projecting portions 32 are provided first and second regulating surfaces 33 and 34 which, when the operating handle 18 is rotated not to axially move away from the driving member 8 but to rotate relative to the driving member 8 with respect to the driving shaft 5, engage with the engaging projections 31 respectively to regulate the relative rotation range of driving member 8 with respect to the driving shaft 5, and at the projecting front surfaces of the projecting portions 32 are provided free rotation control surfaces 35 which, when the operating handle 18 is put in the second position in continuation of the second regulation surface, are biased by the elastic biasing member 19, so as to be elastically contactable with the utmost ends of engaging projections 31 respectively, thereby enabling the free rotation control to be maintained. Furthermore, at the opposite surfaces of the engaging projection 31 to the second regulation surface, as shown in FIG. 7, is provided a slanted guide surface 31*a* through which the engaging projection 31 is guided to the free rotation control surface 35 when the operating handle 18 rotates in the free rotation direction.

Figure 7:
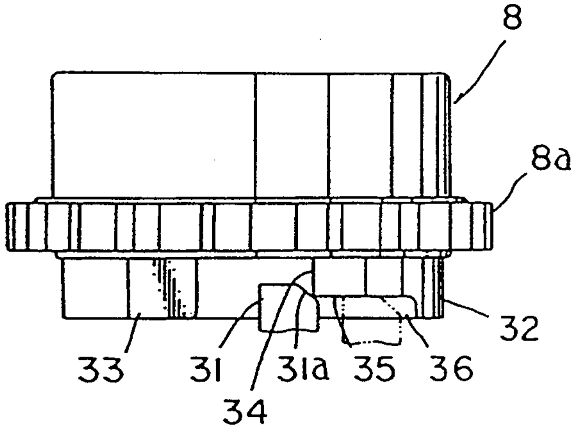
FIG. 7 is an illustration showing that an engaging projection of the operating handle shown in FIG. 6 is operated to be guided to a free rotation control surface.

In addition, in the first embodiment, as shown in FIGS. 3 and 7 at the projecting front surfaces of the projecting portions 32 are provided regulating portions 36 which rise from the free rotation control surfaces 35 and which, when driving member 8 rotates with respect to the driving shaft 5 in the state where the utmost end faces of engaging projections 31 contact with the free rotation control surfaces 35 respectively, engage with the front sides of the engaging projections 31 in the rotating direction thereof respectively.

In the above construction, the driven member 7 and driving member 8 screw with the first and second threaded portions 20 and 21 on the driving shaft 5 in consideration of the workability and strength thereof, in which the first threaded portion 20 may be serrated. Also, the coil spring 24 restricts forward screwing of the driven member 7, but a snap ring, such as an E-ring, may be provided at the second threaded portion 21, or the coil spring 24 may be provided between the snap ring and the driven member 7. The screw thread of the first threaded portion 20 may be coated with nylon resin manufactured by Nylock Co. in U.S.A., having a large elastical repulsion force and a frictional coupling force so as to restrict the forward screwing of driven member 7 by the locking effect of the resin coating. Furthermore, the driven member 7 may be fixed to the driving shaft 5 by screwing a bolt or driving a cotter pin. Thus, the spring 24 is not inevitably required.

Next, explanation will be given on operation of the lever type hoist and traction machine constructed as mentioned above.

Firstly, for hoisting a load, the operating part 15 provided at the operating lever 16 operates to engage the feed pawl of the pawl member 14 with the teeth 8a of the driving member 8 and the lever 16 is operated in swinging motion, thereby normally rotating the driving member 8. The driving member 8, when normally rotating, screws leftwardly in FIG. 1, that is, to the driven member 7, the mechanical brake 13 operates, and the driving torque of driving member 8 is transmitted from the driving shaft 5 to the load sheave 3 through the reduction gear mechanism 6 and tubular shaft 4, so that the hoisting work of a load connected to the chain engaging with the load sheave 3 is performed following the rotation thereof.

When the load is lowered, a reverse rotating pawl of the pawl member 14 at the operating part 15 is engaged with one of the teeth 8a of the driving member 8 to swing the lever 16, thereby reversely rotating the driving member 8. Since the engaging projections 31 are put in the positions X shown by the dotted lines in FIG. 3, in other words, between the first regulation surface 33 and the second regulating surface 34, the driving member 8 rotates with respect to the driving shaft 5 between the first regulation surface 33 and the second regulation surface 34 so as to be rearwardly movable with respect to the driven member 7. Hence, the driven member 7 moves backwardly to stop the braking action of mechanical brake 13 and the driving shaft 5 can reversely rotate only to an extent of reverse rotation of driving member 8, thereby performing the load lowering work in safety.

In addition, during the load hoisting or lowering work, the operating handle 18 is rotated normally or reversely without being pulled toward the stopper 17 against the elastic biasing member 19, whereby the driving member 8 is moved in the direction of operating or not-operating the mechanical brake 13 with respect to the driving shaft 5. Hence, the load sheave 3 is rotated normally or reversely only by a rotation angle corresponding to rotation of operating handle 18, thereby enabling a pulling-out amount or a winding-up amount of the chain to be fine adjusted.

Next, explanation will be given of the case where the load sheave 3 is put in the free rotation state to freely extend or shorten a length of the chain toward the load.

At first, the reversing pawl of pawl member 14 engages with the teeth 8a of driving member 8 and, when the operating handle 18 normally rotates, the driving member 8 is fixed not to rotate together with the operating handle 18. In this state, the operating handle 18 is rotated in the free rotation direction, that is, in the direction of the solid arrow in FIG. 3. The operating handle 18 is guided by the slanted guide surface 31a so as to be moved from the first position to the second position apart from the driving member 8, as shown in FIG. 1. In this state, when the operating handle 18 is further rotated, although the driving member 8 cannot normally rotate because the reversing pawl of the pawl member 14 engages with the teeth 8a at the driving member 8, the driving shaft 5 screwing with the driving member 8 rotates together with the operating handle 18 through the stopper 17. In other words, the driving shaft 5 normally rotates with respect to the driving member 8 and in excess of the range regulated by the first and second regulation surfaces 33 and 34. Accordingly, the driving member 8 axially moves away from the driven member 7 in FIG. 1 so that the braking action by the mechanical brake 13 can be released and the load sheave 3 can be put in the free rotation state, in which the chain, when pulled toward the load side, can be quickly extended at the load side and, when pulled toward the no-load side, can be quickly shortened at the load side.

Figure 5:
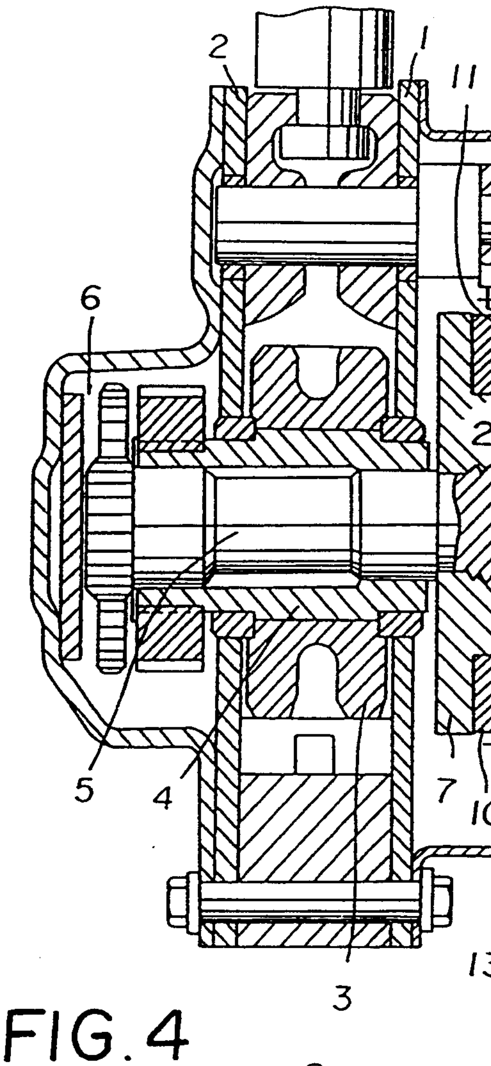
FIG. 5 is a longitudinally sectional view of the state where the hoist and traction machine is operated to freely rotate and the free rotation control is held.
Figure 5:
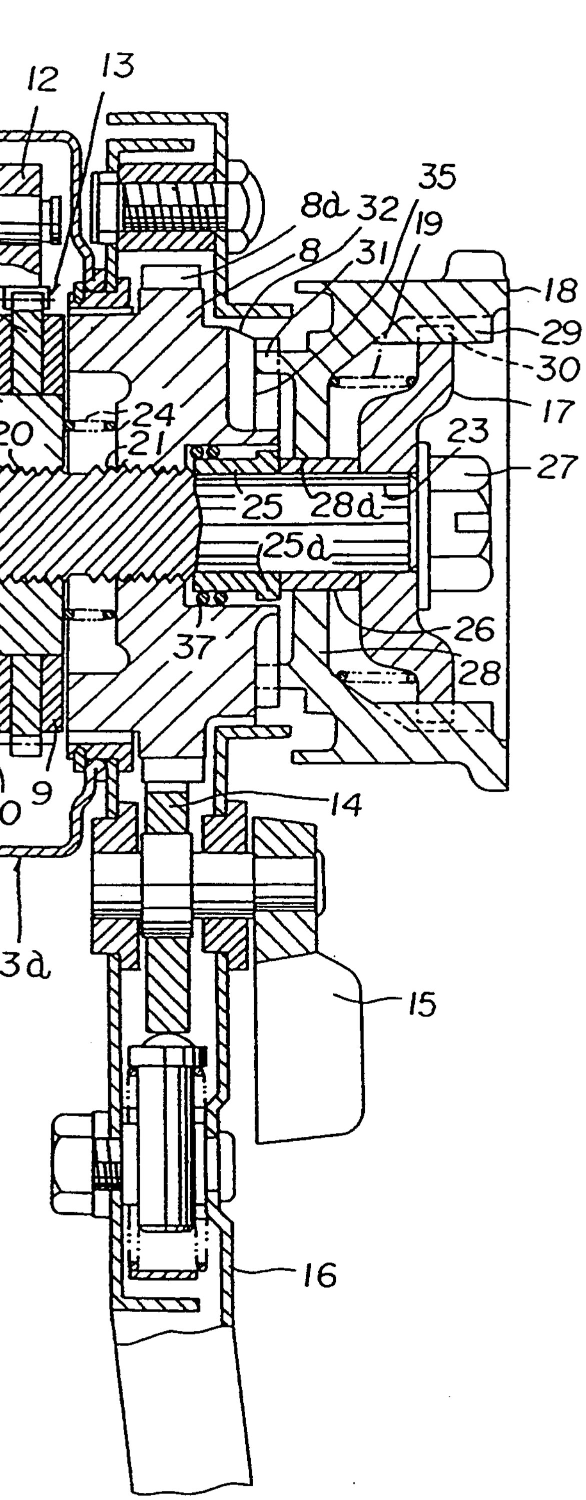

As the mentioned above, the operating handle 18 is merely rotatably operated, in other words, even without being pulled axially outwardly, the engaging projections 31 provided at the operating handle 18 is guided to the free rotation control surface 35 and can be moved to the position Y shown by the dotted line in FIG. 3. Accordingly, there is no need of axially outwardly pulling-out the operating handle 18 to be moved toward the second position, so that the free rotation operation can be performed only by rotatably operating the operating handle is, thereby enabling the efficiency for free rotation to be improved. In this state, since the operating handle 18 is biased toward the driving member 8 by the elastic biasing member 19, so that the projecting utmost ends of engaging projections 31 elastically contact with the free rotation control surfaces 35 of projecting portions 32 provided at the driving member 8 as shown in FIG. 5, whereby frictional resistance caused by the elastic contact can hold the load sheave 3 in the free rotation state. Accordingly, when the chain is adjusted to maintain the free rotation state, the input range of a pulling force of the chain can be extended more than the conventional example, whereby the chain at the load side can be pulled or shortened skill. In addition, in the first embodiment, an elastic ring 37 is interposed between the outer peripheral surface of the first sleeve 25 and the driving member 8 so that the load sheave 3 can further be easily maintained in the free rotation state thereof by the relative rotation resistance of the driving member 8 with respect to the first sleeve 25.

The regulating portions 36 are provided at the projecting portions 32 provided at the driving member 8 so that, when the driving member 8 rotates with respect to the driving shaft 5 in the state where the utmost end surface of the engaging projections 31 are in elastic contact with the free rotation control surfaces 35 of the projecting portions 32, the front of each engaging projection 31 in the rotation direction thereof is regulated of its further rotation by the regulating portion 36, whereby, when the operating handle 18 is rotated with respect to the driving member 8 for freely rotating the load sheave 3, the front of each engaging projection 31 in the rotation direction thereof engages with the regulating portion 36 so as to restrict its rotational angle and an interval between the driving member 8 and the driven member 7 can be restricted not to be wider than required to freely rotate the load sheave 3. Accordingly, when the load sheave 3 freely rotates through the operating handle 18 rotating with respect to the driving member 8, the free rotation operation is performable without uselessly rotating the operating handle 18 more than required. Also, when the chain is excessively pulled toward the load and the stopper provided at the no-load end of chain engages with the side plate 1 or 2 to incapacitate further pulling of chain so as to abruptly stop the rotation of driving shaft 5, the driving member 8 rotates by its inertia force and further screws rightwardly. As the result, the utmost end faces of engaging projections 31 elastically contact further strongly with the free rotation control surfaces 35 at the projecting portions 32 in a biting manner, thereby avoiding incapacitation of release of free rotation control.

Furthermore, in the state of the free rotation control as mentioned above, when the pulling force of chain is strengthened to apply a strong force in the reverse direction onto the load sheave 3, the elastic contact of the projecting utmost end face of each engaging projection 31 with each free rotation control surface 35 is released so that each engaging projection 31 returns to between the first regulating surface 33 and the second regulating surface 34 and, as mentioned above, returns to the state where the mechanical brake 13 exerts or stops the braking action. In other words, during free rotation, when the load sheave 3 is subjected to a strong force in the reverse direction, the driving member 8 screws with the driving shaft 5 and its rotary inertia force is larger than that of the driving shaft 5, whereby the free rotation control surfaces 35 slide with respect to the engaging projections 31 and the driving member 8 starts rotation somewhat later with respect to the rotation of operating handle 18. As the result, the elastic contact of the respective projecting utmost end faces of engaging projections 31 with the free rotation control surfaces 35 is released, resulting in that each engaging projection 31 returns to be between the first regulating surface 33 and the second regulating surface 34. In addition, in this case, the operating handle 18 overcomes the relative-rotational resistance of the projecting utmost end faces of the engaging projections 31 with respect to the free rotation control surfaces 35 and the relative-rotational resistance by the elastic ring 37, thereby relatively-rotating in the reverse rotation direction with respect to the driving resistance 8. Hence, an input range of the pulling force for the chain during the free rotation control is widened so that the free rotation control is performable without requiring skill.

When the chain engaging with the load sheave 3 is subjected to a load and the load sheave 3 is applied with the load in the reverse rotation, even though the operating handle 18 is operated to carry out free rotation, the operating handle 18 together with the driving shaft 5 relatively-rotates in the reverse rotation direction by the above-mentioned load, so that the elastic contact of the utmost end faces of the engaging projection 31 with the free rotation control surfaces 35 is released, thereby returning to the state where the mechanical brake 13 exerts or stops the braking action. Accordingly, the load sheave 3 cannot be put in the free rotation state, thereby improving safety.

Next, explanation will be given of a second embodiment of the invention shown in FIGS. 8 through 13.

The second embodiment assembles an overload preventing mechanism in the first embodiment, and is similar in fundamental construction to the first embodiment. Accordingly, the a description of the constitution in common with the first embodiment is omitted and the common components are designated with the same reference numerals.

In the second embodiment, the driving member 8 in the first embodiment comprises a first driving member 41 having a boss 41*a* screwable with a driving shaft 5 and a larger diameter portion 41*b* opposite to a braking plate 9 of the mechanical brake 13 and a second driving member 42 relatively-rotatably supported onto the outer periphery of the boss 41*a*. At the outer periphery of the second driving member 42 are provided teeth 42*a* engageable with a pawl member 14 provided at the operating lever 16.

At the boss 41*a* of the first driving member 41 are disposed a pair of friction plates 43 and 44 in a manner of longitudinally sandwiching the second driving member 42 therebetween, a disc spring elastic member 46 is disposed outside one friction plate 44 through a holding plate 45, and adjusting member 47, for changing a biasing force of the elastic member 46 to the friction plates 43 and 44, for adjusting a slip load screws with the boss 41*a* outside the elastic member 46, thereby constituting the overload prevention mechanism 40.

In detail, the first driving member 41 is provided at one axial end of the boss 41*a* with the larger diameter portion 41*b* having a biasing surface opposite to the braking plate 9 and at the other axial end of boss 41*a* with a smaller diameter portion 41*c* having a screw thread at the outer periphery, and the elastic member 46 is free-fitted onto the smaller diameter portion 41*c* and the adjusting member 47 screws therewith. A locking groove 41*d* for the holding plate 45 is provided at the outer periphery of the boss 41*a* and a projection projecting from the inner periphery of the holding plate 45 is fitted into the groove 41*d*. The holding plate 45 is being supported to the boss 41*a* so as to be axially movable and non-rotatable relative thereto.

The second driving member 42 comprises a cylindrical member 42*c* having a vertical portion 42*b* and teeth 42*a*. The vertical portion 42*b* is rotatably supported at the inner periphery thereof onto the boss 41*a*. Between the inner periphery of the vertical portion 42*b* and the outer periphery of the boss 41*a* a unidirectional rotation mechanism is provided which, when the second driving member 42 rotates in the driving direction, makes the second driving member 42 freely rotatable with respect to the first driving member 41 and, when rotating in the non-driving direction, makes the same rotatable integrally with the first driving member 41.

Figure 11:
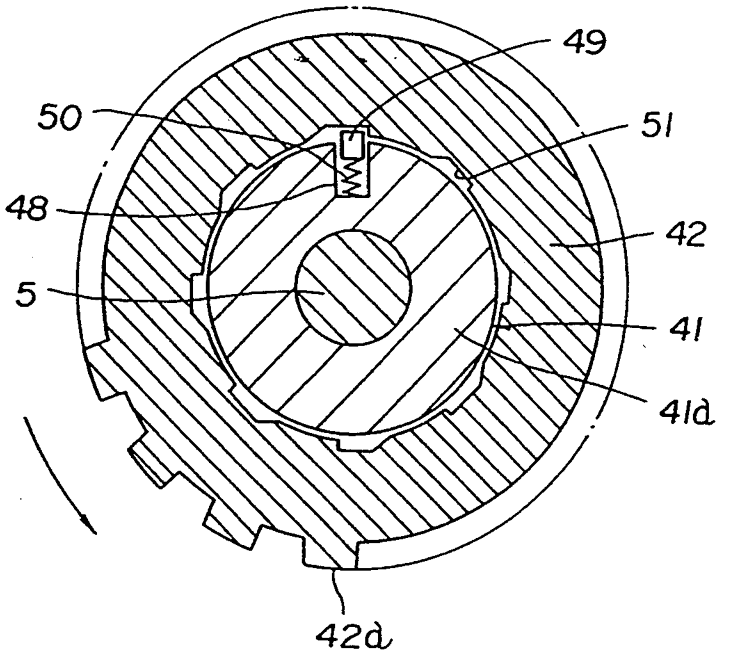
FIG. 11 is an illustration of a unidirectional rotation mechanism.
Figure 12:
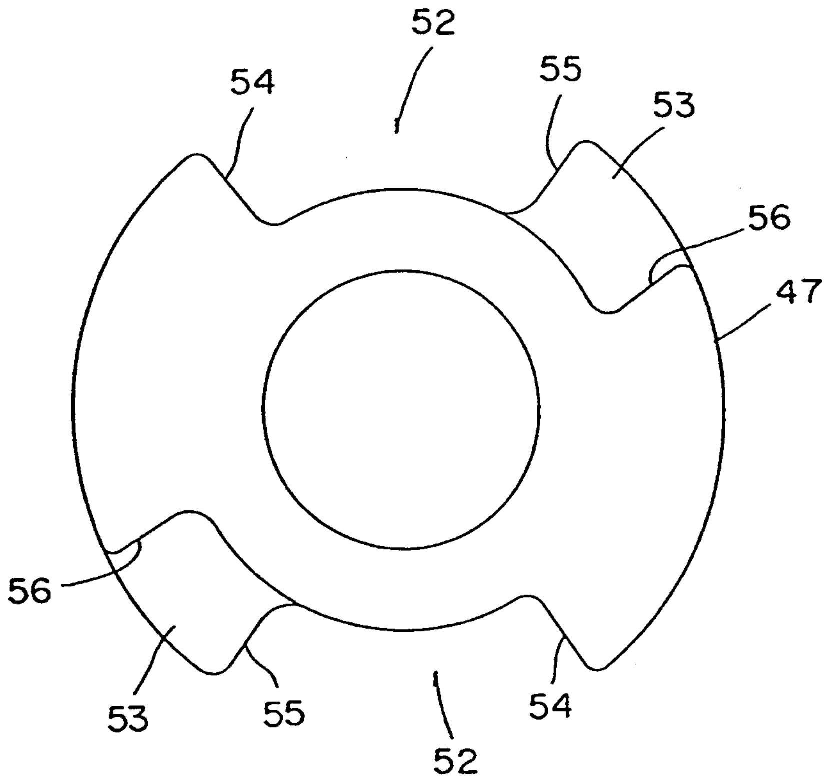
FIG. 12 is a front view of an adjusting member.
Figure 13:
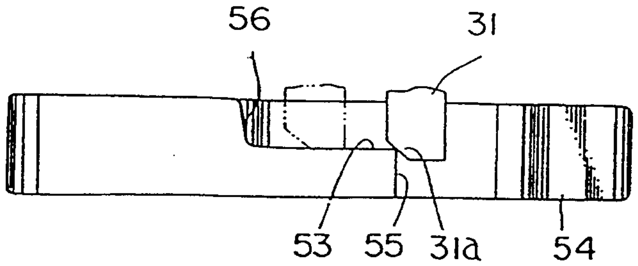
FIG. 13 is an illustration showing that the engaging projection provided at the operating handle is operated to be guided to the free rotation control surface provided at the adjusting member.
Figure 14:
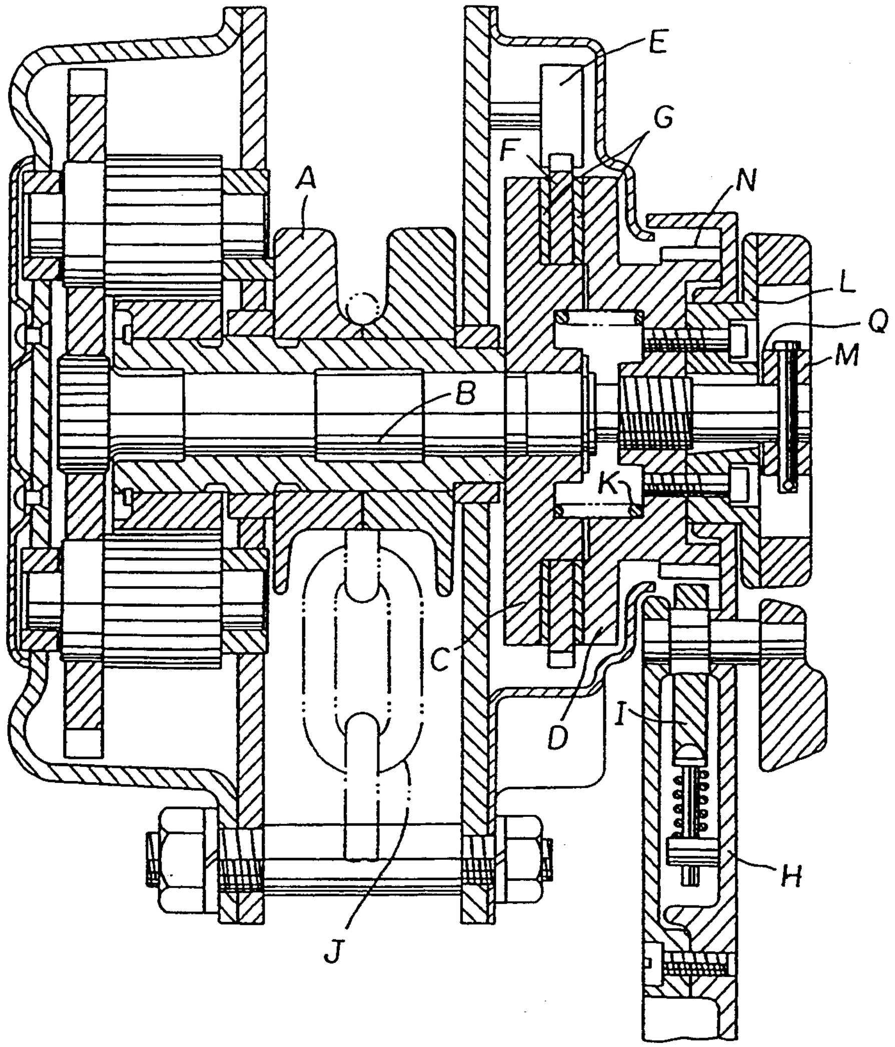
FIG. 14 (PRIOR ART)
FIG. 14 is a sectional view of the conventional example.

The unidirectional rotation mechanism, as shown in FIG. 11, is so constructed that a recess 48 is formed at the outer periphery of the boss 41*a* at the first driving member 41, an engaging member 49 is held in the recess 48 so as to be always biased radially outwardly of the boss 41*a* through a spring 50, and at the inner periphery of the second driving member 42 are formed a plurality (eight in FIG. 9) of engaging grooves which allows the engaging member 49 to enter therein and extends circumstantially in a wedge-like manner, so that when the second driving member 42 is rotated in the chain lowering direction as shown by the arrow in FIG. 11, the engaging member 49 engages with one of the engaging grooves 51 at an angle of at least 45° or more and the second driving member 42 and the first driving member 41 are combined with each other to be integrally rotatable, thereby coping with the case where a torque larger than a transmitting torque of the overload prevention mechanism 40 during the lowering of chain is required.

The second embodiment of the invention constructed as mentioned above assembles therein the overload prevention mechanism 40 and also a free rotation control apparatus as the same as the first embodiment, the free rotation control apparatus is not different from that in the first embodiment, therefore a description thereof is omitted. The adjusting member 47 of the overload prevention mechanism 40 is disposed opposite to the operating handle 18 at the free rotation control apparatus.

Figure 8:
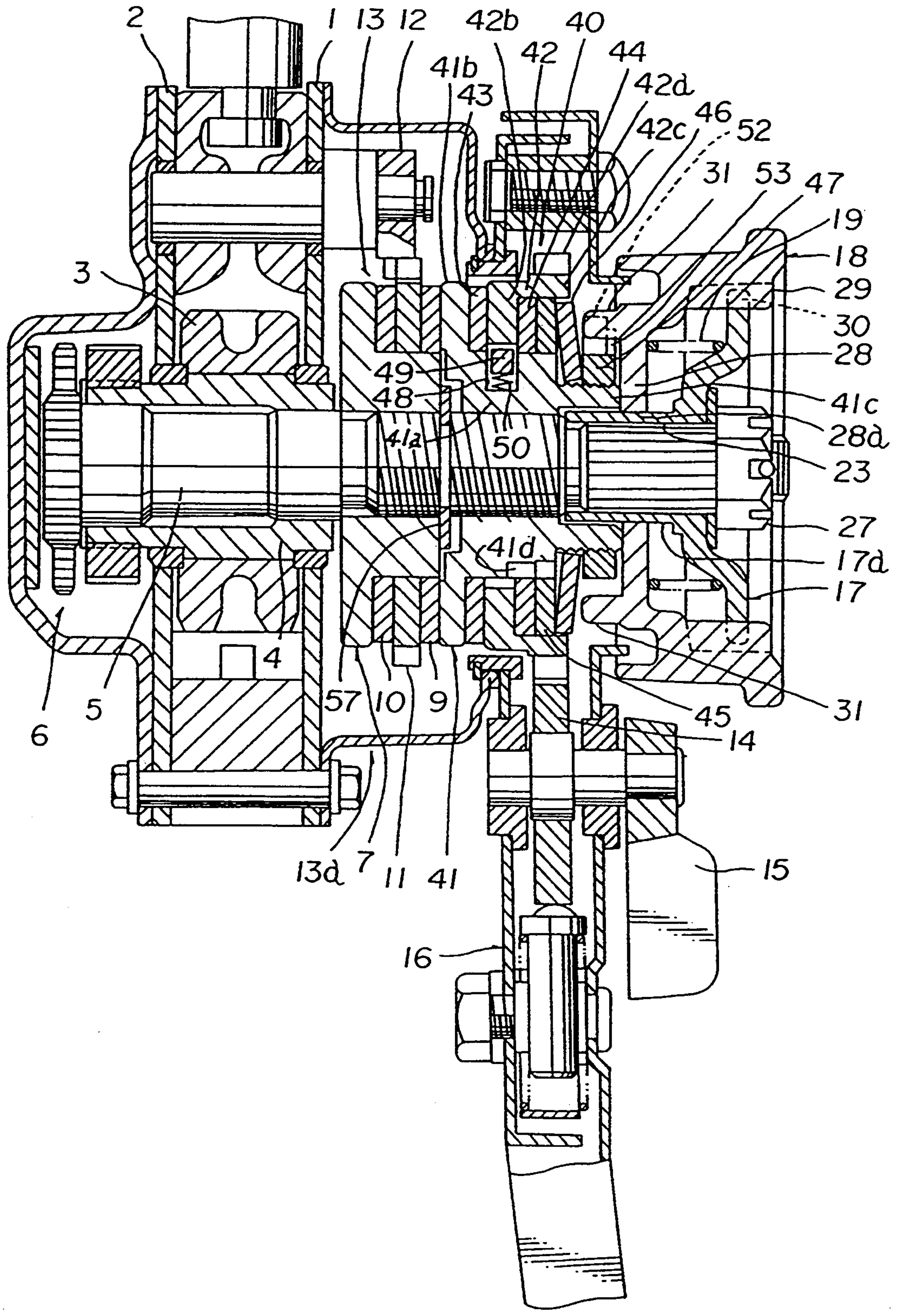
FIG. 8 is a longitudinally sectional view of a second embodiment of the invention.
Figure 10:
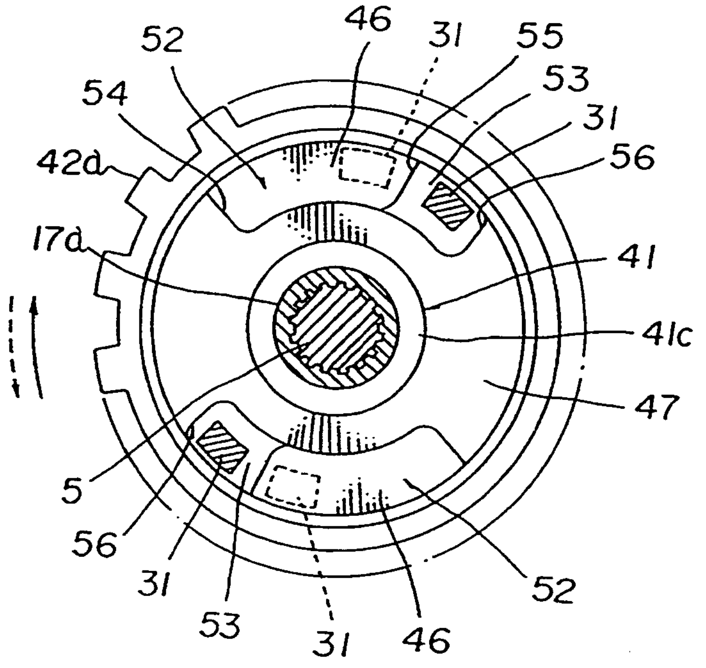
FIG. 10 is a sectional view taken on the line B—B in FIG. 9.

At the adjusting member 47 are provided regulation portions 52 for regulating a relative rotation range of the first driving member 41 with respect to the driving shaft 5 in the first position of the operating handle 18 and free rotation control surfaces 53 which come in elastic contact with the engaging projections 31 provided at the operating handle 18, apply resistance to the rotation of the first driving member 41 with respect to the driving shaft 5, and hold the free rotation of the driving shaft 5 by the operating handle 18, so that the adjusting member 47 may adjust a slip load and also hold the free rotation control at the overload prevention mechanism 40. In greater detail, the adjusting member 47, the regulation portions 52, as shown in FIGS. 8 and 10, are symmetrically cut out at the outer periphery, and first and second regulating surface 54 and 55 are formed at both circumferential sides of each cutout, so that when the operating handle 18 is not operated, in (i.e. the first position), each engaging projection 31 at the operating handle 18, as the same as the first embodiment, enters into the cutout to engage with the regulating surface 54 or 55, thereby regulating the relative rotation range of the first driving member 41 with respect to the driving shaft 5. Accordingly, within the relative rotation range, the first driving member 41 can screw forward or backward with respect to the braking plate 9 and the mechanical brake 13 operates to allow the driving shaft 5 to rotate following the rotations of the first and second driving members 41 and 42, thereby enabling the load to be hoisted, lowered, hauled, or traction-released.

On the opposite surface of the adjusting member 47 to the operating handle 18, and at the front in the normal rotation direction with respect to the regulation portion 52 as shown by the arrow in FIG. 10, are symmetrically provided the free rotation control surface 53 in continuation of the second regulation surface 55 and in elastic contact with the utmost end faces of engaging projections 31 in the second position of the operating handle 18 respectively. The elastic contact of the projections 31 with the free rotation control surfaces 53 applies resistance to the rotation of the first driving member 41 through the adjusting member 47, thereby enabling the free rotation operation by the operating handle 18 to be held.

Figure 9:
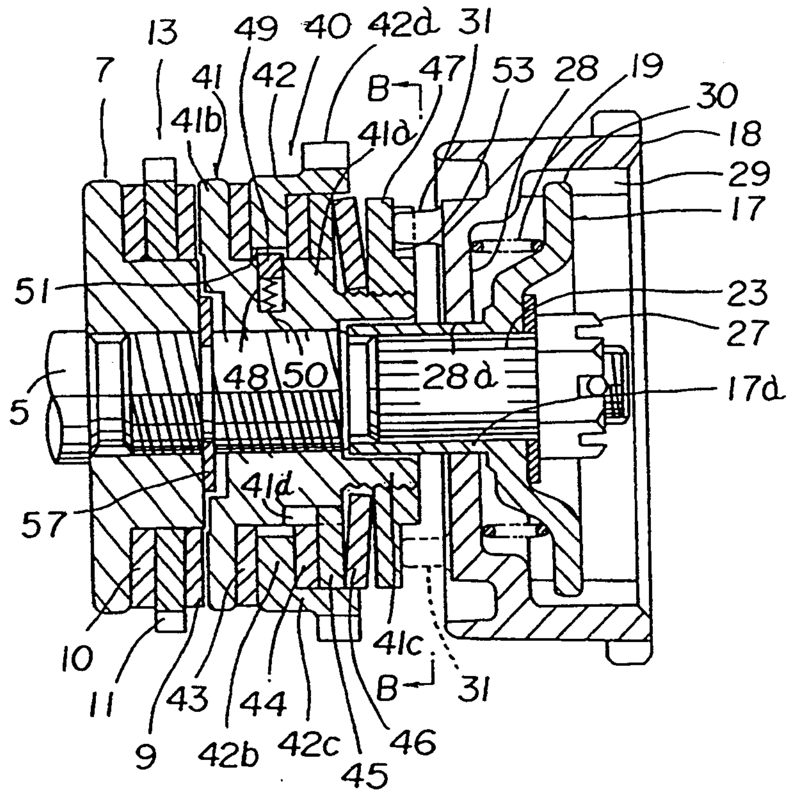
FIG. 9 is a sectional view of the principal portion showing the state where the machine is freely rotated and the free rotation control is held, corresponding to FIG. 8.

Also, in each engaging projection 31, at the opposite surface thereof to the regulation surface 55 as the same as the first embodiment, is formed a slanted guide surface 31*a* for guiding the engaging projection 31 to the free rotation control surface 53 when the operating handle 18 rotates in the free rotation direction (i.e. in the direction of the solid arrow in FIG. 10). Also, in the second embodiment, the second driving member 42, as the same as the first embodiment, is fixed through the pawl member 14 at the lever 16, and then the operating handle 18 is rotated with respect to the first and second driving members 41 and 42, whereby the same is guided by the slanted guide surface 31*a* at the projection 31 so as to be moved to the second position and put in the position of the solid line in FIG. 10, so that the operating handle 18 rotates to integrally rotate the driving shaft 5. Hence, the first driving member 41, screwable with the driving shaft 5, screws backwardly from the braking plate 9, whereby the driving shaft 5 can be put in the free rotation state, at which time the utmost end faces of projections 31, as shown in FIGS. 9 and 10, come into elastic contact with the free rotation control surfaces 53 respectively, whereby the first driving member 41 can be restrained from relative rotation thereof with respect to the driving shaft 5 and the free rotation state of the driving shaft 5 can be held by the restraint.

In addition, in the second embodiment, as shown in FIG. 10, free rotation regulating portions 56 are provided which, when the operating handle 18 is rotated with respect to the first and second driving members 41 and 42, prevent the operating handle 18 from rotating by contacting each projection 31 more than required.

Other than the construction of assembling an overload prevention mechanism in 40, the second embodiment is different from the first embodiment in the following points: At first, the stopper 17 integrally forms at its center a cylindrical member 17*a* serration-coupled with serrations 23 at the driving shaft 5, and the sleeve 25 in the first embodiment is omitted.

Also, the flange 25*a* at the sleeve 25 of the first embodiment is not provided at the cylindrical member 17*a*, whereby the operating handle 18 is biased by the elastic biasing member 19 so as to bring the handle 18 into elastic contact with the end face of a smaller diameter portion 41*c* at the first driving member 41.

Furthermore, a driven member 7 screws with the driving shaft B and is restrained by use of a snap ring 57 from its axial movement.

Next, explanation will be given of operation of the second embodiment constructed as mentioned above.

At first, for the hoisting or traction of load, the feed pawl at the pawl member 14 provided at the operating lever 16 engages with a tooth 42*a* at the second driving member 42 by operating the control portion 15 so as to swing the lever 16, whereby the second driving member 42 is rotated and the first driving member 41 together therewith is normally rotated through the overload prevention mechanism 40. In this case, since the projections 31, as shown by the dotted lines in FIG. 10, are positioned at the regulating portions 52 and between the regulating surfaces 54 and 55, the first driving member 41, when normally rotating, screws toward the braking plate 9 and the mechanical brake 13 operates. A driving torque of the second driving member 42 is transmitted to the first driving member 41 through the overload prevention mechanism 40, and to the driving shaft 5 through the mechanical brake 13, and is also transmitted from the driving shaft 5 to the load sheave 3 through the reduction gear mechanism 6 and tubular shaft 4, thereby enabling the hoisting or traction of load. In this state, when the load sheave 3 is subjected to a load more than the rating load adjusted by the adjusting member 47, the overload prevention mechanism 40 slips to eliminate power transmission to the first driving member 41, thereby enabling the hoisting or the traction over the rating to be regulated.

In a case where chain lowering or the release of traction is performed, the reverse rotation pawl at the pawl member 14 engages with one of the teeth 42*a* of the second driving member 42 so as to swing the lever 16, whereby the first driving member 44 is reversely and integrally rotated with the second driving member 42 through a unidirectional rotation mechanism. In this case, since the projections 31 are positioned at the regulating portions 52, the first driving member 41 rotates with respect to the driving shaft 5 to be backwardly screwable with respect to the braking plate 9, so that the driving shaft 5 can be rotated at a predetermined angle until the mechanical brake 13 operates, thereby enabling the hoisting or traction of the chain.

In this case, the lever 16 is operated in swinging motion to rotate the first and second driving members 41 and 42 in the non-driving direction, that is, to reversely rotate them, thereby reversely rotating the first driving member 41. As shown in FIG. 11, at the inner periphery of the second driving member 42, a plurality of the engaging grooves 51 engageable with the engaging member 9 are provided spaced at equal intervals, so that the engaging member 49 engages with one engaging groove 51 at an angle of at least 45° and without the need of once rotating the second driving member 42, thereby enabling the second driving member 42 to be integral with the first driving member 41 and to quickly start the lowering of the chain or the release of traction to that extent.

Next, explanation will be given of the case where the driving shaft 5 is put in the free rotation state so as to carry out free extension or contraction of the chain at the load side.

Such operation, similar to the first embodiment, can be carried out in such a manner that the reverse rotation pawl of the pawl member 14 engages with the teeth 42*a* of the second driving member 42 and, when the operating handle 18 normally rotates, the second driving member 42 is made non-rotatable together with the operating handle 18, and then the operating handle 18 is normally rotated only. In detail, the operating handle 18 is rotated in the direction of the arrow in FIG. 10 so that the slanted guide surface 31*a* at the engaging projection 31 comes into contact with the second regulation surface 55 and is guided thereto, whereby the engaging projection 31 is guided to the free rotation control surface 53. Accordingly, similar to the first embodiment, the operating handle 18 need not be axially outwardly pulled out to be moved toward the second position, thereby being guided to the free rotation control surface 53 only by rotatable operation. At this time, although the second driving member 42 hose tooth 42*a* engages with the reverse rotation pawl of the pawl member 14, cannot normally rotate, the driving shaft 5 together with the operating handle 18 is relatively rotated in the normal direction through the stopper 17 in excess of the ranges regulated by the regulating portions 52. The first driving member 41 is moved by the relative rotation away from the braking plate 9, (i.e. rightwardly in FIG. 8), whereby the braking action by the mechanical brake 13 can be released to put the driving shaft 5 in the free rotation state. The elastic biasing member 19 biases the projecting utmost end faces of the projections 31 to come into elastic contact with the free rotation control surfaces 53 at the adjusting 47 as shown in FIGS. 9 and 10, whereby the operating handle 18 can be restricted from its relative rotation with respect to the first and second driving members 41 and 42. Hence, it is possible to keep the driving shaft 5 in the free rotation state. Accordingly, the chain, when pulled to the load side in this state, can quickly be extended and, when pulled to the no-load side, can quickly be contracted.

In addition, during the reverse rotation of driving shaft 5, the projections 31 come into elastic contact with the free rotation control surfaces 53, but the adjusting member 47 does not rotate to axially move by this elastic contact and does not change the rating load on which the overload prevention mechanism 40 starts its operation. In other words, since the adjusting member 47 is subjected to the reaction force of the elastic member 46, the rotational resistance of adjusting member 47 is larger than that when the operating handle 18 in elastic contact at the projections 31 with the free rotation control surfaces 53 rotates with respect to the first driving member 41, whereby the adjusting member 47 never rotates by a torque transmitted thereto through the projections 31. Accordingly, a slip load of the overload prevention mechanism 40 preadjusted by the adjusting member 47 never changes.

Furthermore, in the state where the driving shaft 5 is held in the free rotation state as the mentioned above, when a pulling force of the chain is strengthened to apply to the driving shaft 5 a strong force in the reverse rotation direction, the elastic contact of the respective utmost end faces of the projection 31 with respect to the respective free rotation control surfaces 53 is released, whereby the projections 31 return to the regulating portions 52 so as to return to the state where the mechanical brake 13 can operate.

As mentioned above, in the second embodiment, when the operating handle 18 is operated in non-free-rotation mode, allows the first driving member 41 to screw forward and backward with respect to the braking plate 9 so as to operate the mechanical brake 13, whereby the hoisting, lowering, traction of the load, and release of traction are performable and also the overload prevention mechanism 40 is simultaneously performable. Moreover, the operating handle 18, when freely rotating, is rotated with respect to the first and second driving members 41 and 42, similar to the first embodiment, and the projections 31 at the operating handle 18 are brought into elastic contact with the free rotation control surfaces 53 to enable the free rotation of the driving shaft 5 to be held Accordingly, the overload prevention mechanism 40 can operate to perform overload prevention and also the free rotation operating handle 18 can hold the driving shaft 5 in the free rotation state without requiring skill. Moreover, the adjusting member 47 is used not only for adjusting the rating load of the overload prevention mechanism 40 but also for holding the driving shaft 5 in the free rotation state.

In addition, in the above-mentioned second embodiment, as shown in FIG. 11, the engaging member 49 is held in the recess 48 at the outer periphery of the boss 41*a* of the first driving member 41 and the engaging grooves 51 are provided at the inner periphery of the second driving member 42, but the engaging 49 may be held at the second driving member 42 and a plurality of engaging grooves may be provided at the outer periphery of the boss 41*a*.

Also, in the above-mentioned embodiment, the engaging projection 31 is projected from the opposite surface of the operating handle 18 to the driving member 8 or the adjusting member 47 and the free rotation control surface 35 or 53 is provided at the opposite surface of the driving member 8 or the adjusting member 47 to the operating handle 18, but the engaging projection 31 may be provided at the driving member 8 or the adjusting member 47 and the free rotation control surface 35 or 53 may be provided at the operating handle 18.

In the case where the slanted guide surface 31*a* is provided, other than the provision thereof at the engaging projection 31, the guide surface 31*a* may be provided at the second regulation surface 34 and may be provided at both the members 31 and 34.

As seen from the above, the hoist and traction machine of the present invention can release the braking action of the mechanical brake and perform the free rotation control by the free rotation operation such that the operating handle 18 is moved away from the driving member 8 against the elastic biasing member 19 and normally rotated and also can hold the state of releasing the braking action of the mechanical brake, in brief, the free rotation control by being biased by the elastic biasing member 19. Accordingly, the free rotation operation is simple to improve its operational efficiency and the input range of pulling force of the chain during the free rotation control is expanded to ensure free rotation control without requiring skill.

Accordingly, free extension or contraction of the chain with respect to the load side can simply be carried out without requiring skill, but only by simply rotating the operating handle 18.

When the chain engaged with the load sheave 3 is subjected to the load, even though the free rotation operation is intended to freely rotate, the free rotation state cannot be held, thereby raising the safety. Also, as described in the second embodiment, the hoist and traction machine assembling therein the overload prevention mechanism 40 can perform the overload prevention by operating the overload prevention mechanism 40 and also operating the operating handle 18 to hold the driving shaft 5 in the free rotation state without requiring skill. Moreover, the adjusting member 47 is used not only for adjusting the rating load of the overload prevention mechanism 40 but also for holding the driving shaft 5 in the free rotation state, thereby saving the number of required parts.

Although the invention has been described with reference to several different embodiments, these embodiments are merely exemplary and not limiting of the invention which is defined solely by the appended claims.

What is claimed is:

1. A hoist and traction machine comprising:
a load sheave;
a driving shaft, having a driven member, for driving said load sheave;
a driving member threadingly mounted to said driving shaft;
a braking pawl;
a braking ratchet wheel engageable with said braking pawl;
braking plates, interposed between said driving member and said driven member, constituting a mechanical brake;
driving means for normally and reversely driving said driving member;
a free rotation control means for controlling operation of said mechanical brake so as to selectively provide free rotation for said load sheave, said free rotation control means comprising
(a) a stopper provided at an axial end of said driving shaft so as to be non-rotatable and axially immovable with respect to said driving shaft,
(b) a free-rotation operation handle provided between said stopper and said driving member in such a manner as to be axially movable between a first position, proximate to said driving member, and a second position, spaced therefrom, said free-rotation operation handle being engaged with said stopper so as to be non-rotatable relative to said driving shaft, said free-rotation operation handle being rotationally operable to rotate said driving shaft and cause said driving member to screw backward in a non-braking direction, so as to provide the free rotation operation,
(c) an elastically biasing member, interposed between said stopper and said free-rotation operation handle, for biasing said free-rotation operation handle toward said first position proximate to said driving member,
(d) regulation means, provided between said free-rotation operation handle and said driving member, for (i) regulating a relative rotation range of said driving member with respect to said driving shaft when said free-rotation operation handle is placed in the first position and (ii) releasing said regulation when said handle is put in the second position, and
(e) free-rotation-control holding means for applying a biasing force of said elastically biasing member to said driving member, when (1) said free-rotation operation handle is in the second position so as to release said regulation and (2) said free-rotation operation handle is rotated to perform the free rotation operation, so as to maintain said free rotation operation, said free rotation control holding means comprising a free rotation control surface and an engaging projection for being placed in elastic contact with said free rotation control surface by said biasing force of said elastic member, one of (1) said free rotation control surface and (2) said engaging projection being provided at said driving member, and the other of (1) said free rotation control surface and (2) said engaging projection being provided at said free-rotation operation handle;
said regulation means being provided with a first regulation surface and a second regulation surface which are engageable with the engaging projection,
said free rotation control surface being provided at a location in contact with said second regulation surface, and a slanted guide surface for guiding said engaging projection to said free rotation control surface when said operating handle rotates in the direction of free rotation being provided on at least one of (1) said engaging projection at its surface confronting said second regulation surface and (2) said second regulation surface.

2. A hoist and traction machine according to claim 1, further comprising an overload prevention mechanism comprising friction plates;

an elastic biasing member; and an adjusting member, said driving member comprising (a) a first driving member having a boss screwable with (i) said driving shaft and (ii) a large diameter portion opposing a braking plate of said mechanical brake, and (b) a second driving member relatively-rotatably supported to said boss of said first driving member, wherein said boss at said first driving member supports said friction plates and said elastic biasing member, and screws with said adjusting member so as to change a biasing force on said friction plates caused by said elastic biasing member so as to adjust a slip load of said machine, said elastic biasing member being disposed opposite to said free-rotation operation handle and between said adjusting member and said free-rotation operation handle.

* * * * *